(12) United States Patent
Henderson et al.

(10) Patent No.: US 11,691,475 B2
(45) Date of Patent: Jul. 4, 2023

(54) UNIVERSAL CONTROL FOR RECREATIONAL VEHICLE AIR CONDITIONER

(71) Applicant: Haier US Appliance Solutions, Inc., Wilmington, DE (US)

(72) Inventors: Richard Dustin Henderson, La Grange, KY (US); Tal Abraham Ohayon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 32 days.

(21) Appl. No.: 17/245,318

(22) Filed: Apr. 30, 2021

(65) Prior Publication Data
US 2022/0348056 A1 Nov. 3, 2022

(51) Int. Cl.
*B60H 1/00* (2006.01)
*B60H 1/32* (2006.01)

(52) U.S. Cl.
CPC ....... *B60H 1/00821* (2013.01); *B60H 1/3205* (2013.01)

(58) Field of Classification Search
CPC .............. B60H 1/00821; B60H 1/3205; B60H 1/00985; B60H 1/3226; B60H 1/323; B60H 1/00364
See application file for complete search history.

(56) References Cited

U.S. PATENT DOCUMENTS

| | | | |
|---|---|---|---|
| 5,269,458 A * | 12/1993 | Sol | F23N 5/242 236/94 |
| 7,844,764 B2 | 11/2010 | Williams | |
| 8,767,379 B2 | 7/2014 | Whitaker | |
| 10,696,129 B2 | 6/2020 | Bergin | |
| 2009/0209193 A1* | 8/2009 | Kloster | B60H 1/3204 454/241 |
| 2012/0091214 A1* | 4/2012 | Rixen | F23N 3/08 237/5 |
| 2019/0128551 A1 | 5/2019 | Heral | |
| 2019/0299741 A1* | 10/2019 | Xie | B60H 1/00271 |

* cited by examiner

*Primary Examiner* — Marc E Norman
(74) *Attorney, Agent, or Firm* — Dority & Manning, P.A.

(57) ABSTRACT

A recreational vehicle air conditioner and methods of operating a recreational vehicle air conditioner are provided. The recreational vehicle air conditioner may be configured for, and the method may include, receiving a mode selection input comprising one of a thermostat mode and a direct control mode. The recreational vehicle air conditioner may further be configured for, and the method may further include, operating the recreational vehicle air conditioner independently of an external display device when the mode selection input is thermostat mode and operating the recreational vehicle air conditioner in response to one or more commands from the external display device when the mode selection input is direct control mode.

16 Claims, 9 Drawing Sheets

UNIVERSAL CONTROL FOR RECREATIONAL VEHICLE AIR CONDITIONER

FIELD OF THE INVENTION

The present subject matter relates generally to air conditioners in recreational vehicles, and more particularly, to air conditioner units which are compatible with various display and/or control components.

BACKGROUND OF THE INVENTION

Certain recreational vehicles include an air conditioner unit, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

The RVACs interface with an external display and/or control device, such as a thermostat, which receives a user input such as a set temperature. Some external display devices provide centralized control, where the display device has a relatively high degree of control of the RVAC unit, which may include directly commanding components of the RVAC unit, such as one or more fans and/or a compressor, to turn on or off. Other external display devices provide decentralized control, where the display device has a relatively low degree of control over the RVAC unit, such as sending the set temperature to the RVAC unit and allowing a controller of the RVAC unit to automatically turn the RVAC unit on and off as needed to meet the set temperature. Typical RVAC units which are compatible with one of the foregoing control types are not compatible with the other. For instance, typical RVAC units which are compatible with display devices that provide centralized control are not compatible with display devices that provide decentralized control, and vice versa.

Accordingly, an improved air conditioner unit would be useful. More specifically, a recreational vehicle air conditioner that is compatible with various control types, such as selectively operable in one or another control mode, would be particularly beneficial.

BRIEF DESCRIPTION OF THE INVENTION

Aspects and advantages of the invention will be set forth in part in the following description, or may be apparent from the description, or may be learned through practice of the invention.

In accordance with one exemplary embodiment of the present disclosure, a recreational vehicle air conditioner is provided. The recreational vehicle air conditioner includes an indoor cover that defines an indoor portion and an outdoor portion. An outdoor heat exchanger and an outdoor fan are disposed in the outdoor portion. An indoor heat exchanger and an indoor fan are disposed in the indoor portion. The recreational vehicle air conditioner also includes a compressor in fluid communication with the outdoor heat exchanger and the indoor heat exchanger to circulate a refrigerant between the outdoor heat exchanger and the indoor heat exchanger. The recreational vehicle air conditioner further includes a local controller onboard the recreational vehicle air conditioner. The local controller is in operative communication with the outdoor fan, the indoor fan, the compressor, and an external display device. The local controller is configured for receiving a mode selection input comprising one of a thermostat mode and a direct control mode. When the mode selection input is thermostat mode, the local controller of the recreational vehicle air conditioner operates at least one of the outdoor fan, the indoor fan, and the compressor independently of the external display device. When the mode selection input is direct control mode, the local controller of the recreational vehicle air conditioner operates at least one of the outdoor fan, the indoor fan, and the compressor in response to one or more commands from the external display device.

In accordance with another exemplary embodiment of the present disclosure, a method of operating a recreational vehicle air conditioner is provided. The recreational vehicle air conditioner includes an indoor cover defining an indoor portion and an outdoor portion, an outdoor heat exchanger and an outdoor fan disposed in the outdoor portion, an indoor heat exchanger and an indoor fan disposed in the indoor portion, a compressor in fluid communication with the outdoor heat exchanger and the indoor heat exchanger to circulate a refrigerant between the outdoor heat exchanger and the indoor heat exchanger, and a local controller onboard the recreational vehicle air conditioner. The method includes receiving a mode selection input comprising one of a thermostat mode and a direct control mode, and includes receiving a set temperature by a display device external of the recreational vehicle air conditioner. The method also includes operating at least one of the outdoor fan, the indoor fan, and the compressor, by the local controller onboard the recreational vehicle air conditioner, independently of the external display device when the mode selection input is thermostat mode. The method further includes operating at least one of the outdoor fan, the indoor fan, and the compressor in response to one or more commands from the external display device when the mode selection input is direct control mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
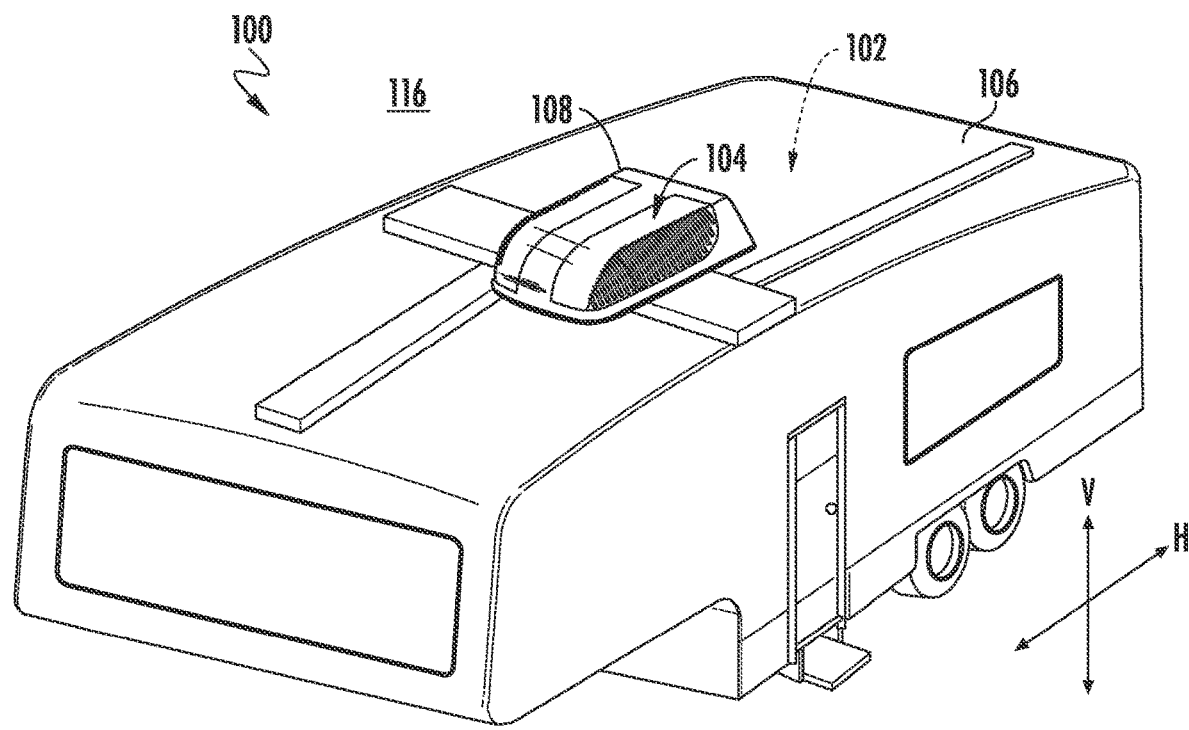
FIG. 1 provides a perspective view of a recreational vehicle according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment of recreational vehicle 100, climate control of the passenger compartment is desirable.

Accordingly, an air conditioner unit 104 may be mounted on recreational vehicle 100 to provide cooled air to the passenger compartment. Air conditioner unit 104 is typically mounted to an outside surface 106 of recreational vehicle 100. This arrangement is desirable because a byproduct of operation of air conditioner unit 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioner unit 104 may be mounted on an outer surface 106, such as the ceiling or top of recreational vehicle 100. Also as shown in FIG. 1, air conditioner unit 104 may include a top cover or outer grille 108 that is positioned over the working components of air conditioner unit 104, e.g., to protect such working components from rain, wind, debris, etc.

Figure 2:
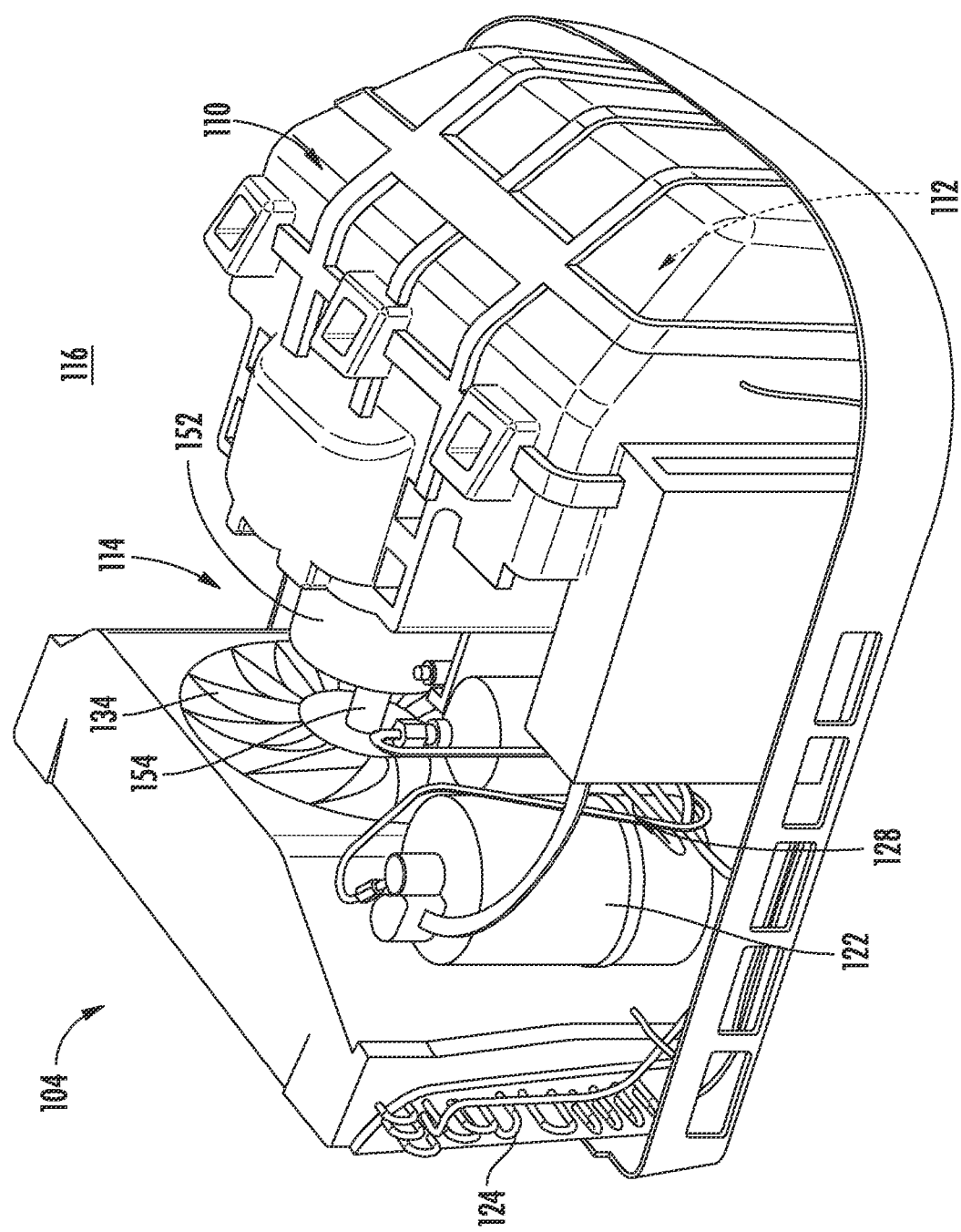
FIG. 2 provides a perspective view of a recreational vehicle air conditioner (RVAC) that may be used with the exemplary recreational vehicle of FIG. 1, with an outdoor cover removed for clarity.
Figure 3:
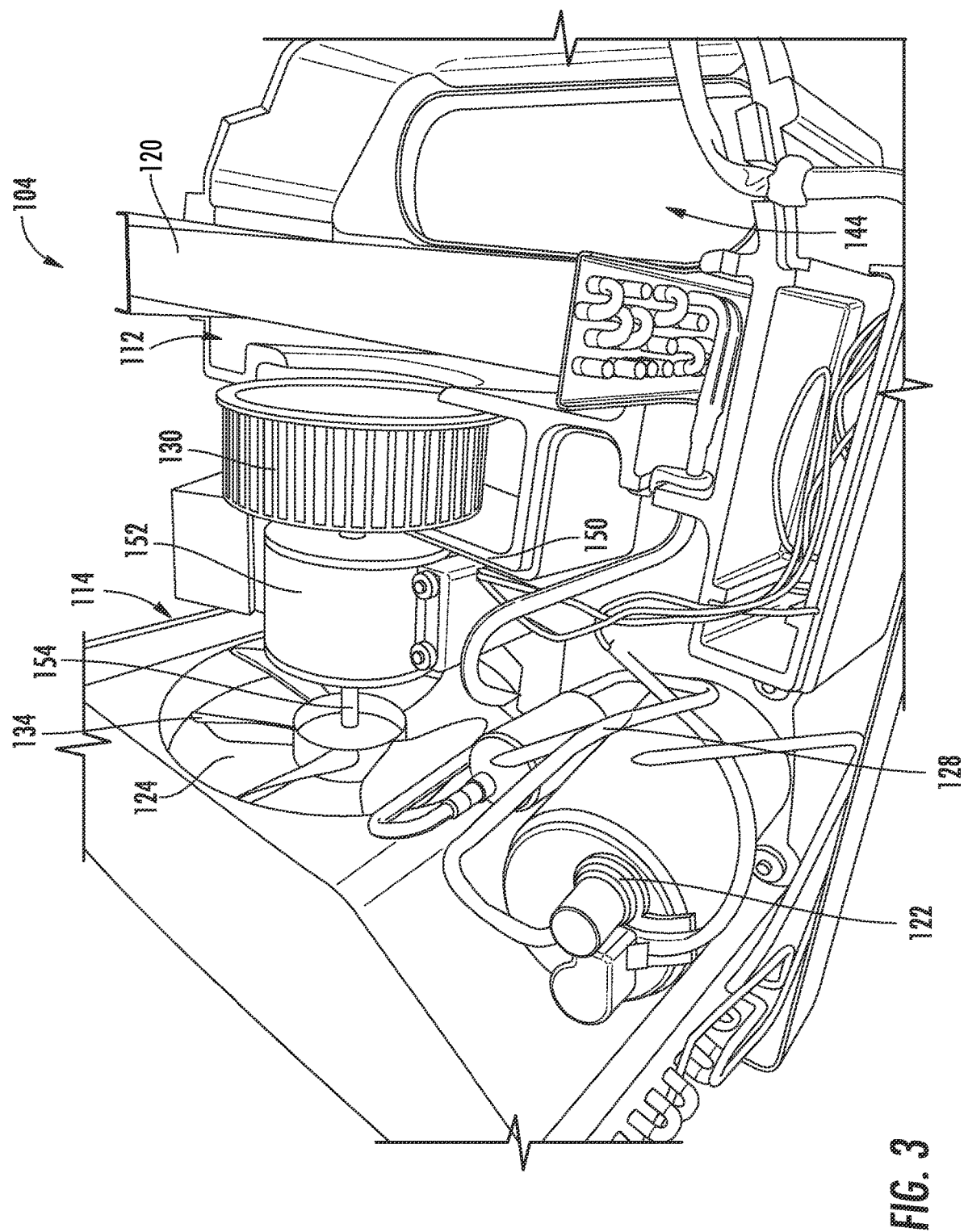
FIG. 3 provides a perspective view of the exemplary RVAC of FIG. 2 with an indoor cover removed for clarity.
Figure 4:
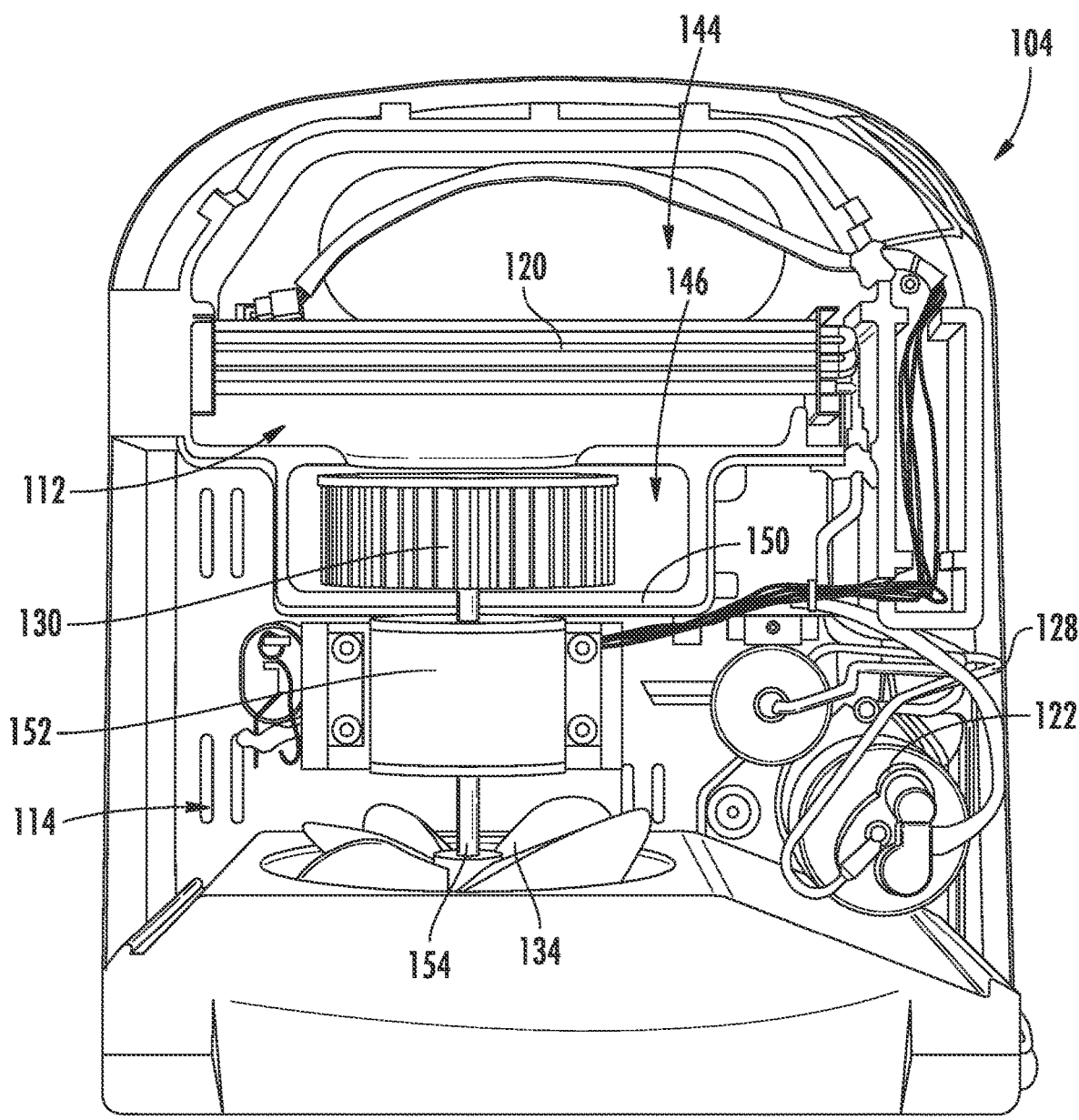
FIG. 4 provides a top view of the exemplary RVAC of FIG. 2 with an indoor cover removed for clarity.
Figure 5:
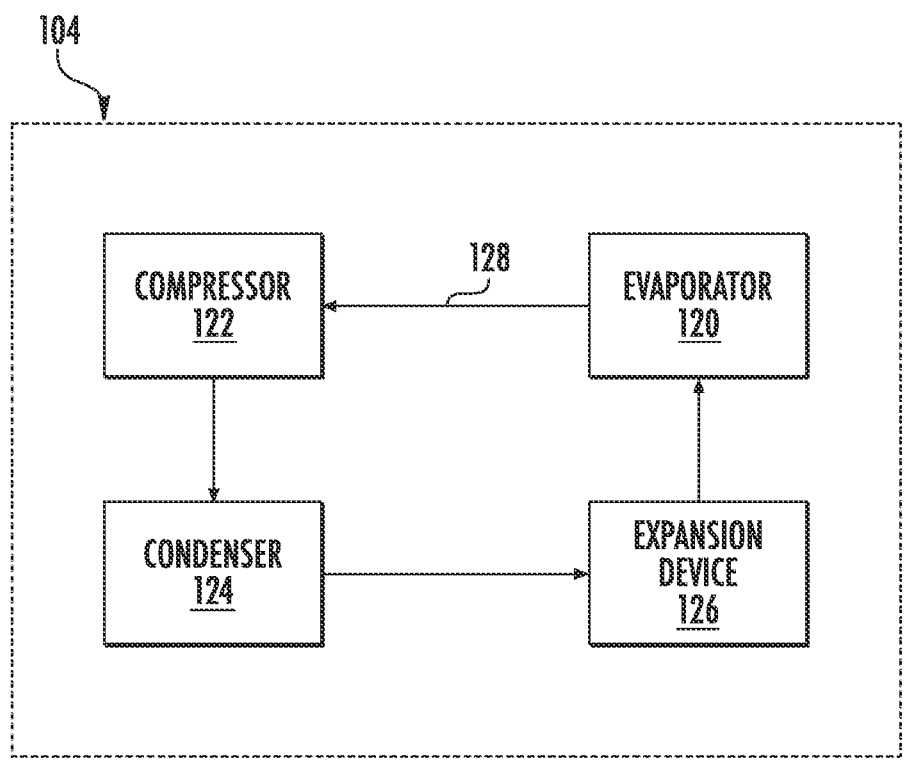
FIG. 5 provides a schematic view of an air conditioner according to an exemplary embodiment of the present disclosure.
Figure 6:
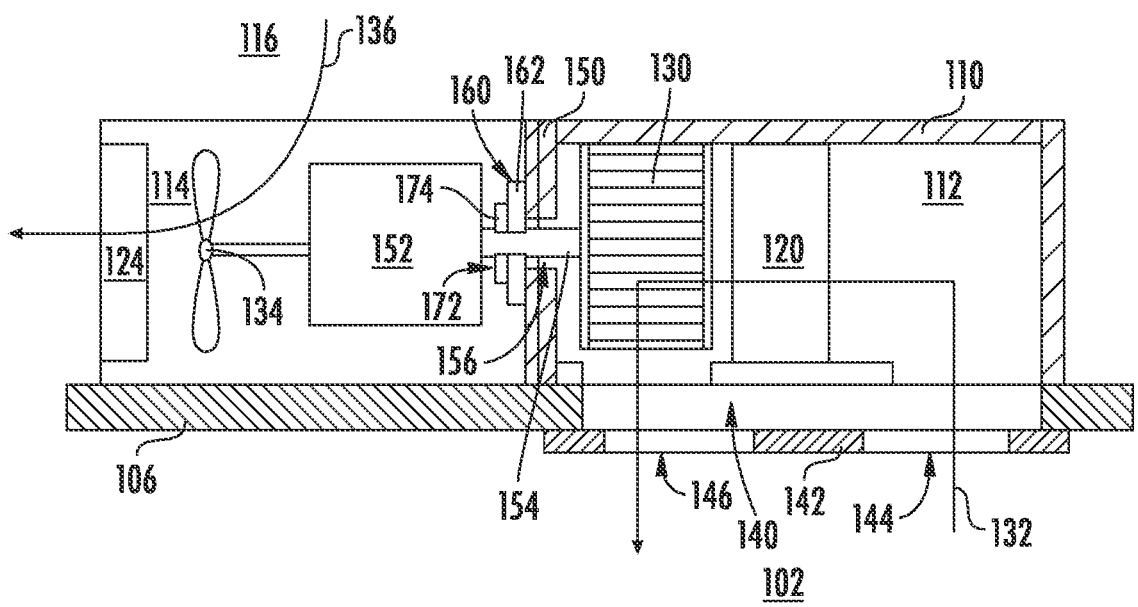
FIG. 6 provides a schematic side view of the exemplary RVAC of FIG. 2.

Referring now generally to FIGS. 2 through 6, the operation of air conditioner unit 104 will be described in more detail according to exemplary embodiments of the present subject matter. As illustrated, outer grille 108 has been removed to reveal working components of air conditioner unit 104. Air conditioner unit 104 generally includes an indoor bulkhead or indoor cover 110 that divides air conditioner unit 104 between an indoor and outdoor portion, such as in a packaged terminal air conditioner unit (PTAC) or a split heat pump system. Specifically, indoor cover 110 defines an indoor air plenum 112 and an outdoor air plenum 114. In this regard, as shown in FIGS. 2 and 6, indoor cover 110 generally shields the indoor components of air conditioner unit 104 from the outdoor environment 116. As shown in FIGS. 3 and 4, indoor cover 110 is removed to reveal additional working components of air conditioner unit 104, each of which will be described below in detail.

Referring now generally to FIGS. 2 through 6, relevant components of air conditioner unit 104 will be described. It will be understood that air conditioner unit 104 includes various heat pump components, such as a sealed system, for treating air within an interior of an associated recreational vehicle 100. Such components are well understood by those skilled in the art and a description of such components is omitted for the sake of brevity. In this regard, for example, air conditioner unit 104 includes refrigerant circulating between an indoor heat exchanger 120 (FIGS. 3 and 4), where the indoor heat exchanger 120 may be, e.g., an evaporator when the air conditioner unit is in a cooling mode, a compressor 122, an outdoor heat exchanger 124, where the outdoor heat exchanger 124 may be, e.g., a condenser when the air conditioner unit is in a cooling mode, and an expansion device 126 (FIG. 5), as shown in the refrigeration loop 128 of air conditioner unit 104 in FIG. 2. Refrigerant, also known as coolant, carries heat from the passenger compartment 102 of recreational vehicle 100 to the outdoors 116 (e.g., an ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner system 104 may include an indoor fan 130 configured for urging a flow of indoor air (e.g., as identified by reference numeral 132 in FIG. 6). Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioner unit 104 may include an outdoor fan 134 configured for urging a flow of outdoor air (e.g., as identified by reference numeral 136 in FIG. 6), thereby facilitating heat transfer from the heated refrigerant to the ambient air (outdoor air). In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

In some embodiments, the air conditioner unit 104 may also be operable in a heat pump mode. For example, the air conditioner unit 104 may include a reversing valve (not shown) which, when actuated, directs the refrigerant to flow in the reverse direction and reverse order from that described above. Thereby, the air conditioner unit 104 may selectively transfer heat from the outdoor environment 116 to the passenger compartment 102, e.g., the indoor heat exchanger 120 may operate as the condenser and the outdoor heat exchanger 124 may operate as the evaporator, based on the position or state of the reversing valve in the heat pump mode.

In order to transport air, e.g., cooled air, from the air conditioner unit 104 on an outside surface 106 of recreational vehicle 100 to the passenger compartment 102 on the inside of recreational vehicle 100, outer surface 106 may define an opening 140 that is in fluid communication with indoor air plenum 112. In addition, air conditioner unit 104 may include a ceiling-mount cover panel 142 that may be mounted on a ceiling within an interior of an associated recreational vehicle. Cover panel 142 may overlay and hide components of air conditioner unit 104 to provide a pleasant cosmetic appearance for air conditioner unit 104. Cover panel 142 may also include, e.g., louvers, perforated sections, and/or other air flow apertures, to allow the flow of indoor air 132 through cover panel 142.

For example, cover panel 142 may include an air inlet 144 and an air outlet 146. Air inlet and outlet 144, 146 may be separate from each other on cover panel 142. Air from within the interior of the associated recreational vehicle 100 may flow through cover panel 142 via air inlet 144, and such air may be treated (e.g., heated or cooled) by a sealed system of air conditioner unit 104, and the treated air may then flow back into the interior of the associated recreational vehicle through cover panel 142 via air outlet 146. Cover panel 142 may also include a removable filter cover (not shown) mounted to cover panel 142 and being perforated to allow air flow through the filter cover. For example, the filter cover may support or hold a filter medium, such as a concertinaed or pleated fabric filter, fiberglass filter, etc., that filters air entering air conditioner unit 104 at air inlet 144.

As shown, indoor fan 130 is positioned within indoor air plenum 112, e.g., adjacent a vertical bulkhead 150 which is part of indoor cover 110. According to the illustrated embodiment, a fan drive motor 152 is positioned outside of indoor air plenum 112, e.g., within outdoor air plenum 114. This may be advantageous, for example, to cool drive motor 152 by permitting the flow of outdoor air 136 to pass over drive motor 152, to reduce noise within passenger compartment 102, or for a variety of other reasons. Notably, however, mounting drive motor 152 outside of indoor air plenum 112 requires a drive shaft 154 to pass through indoor cover 110 in order to mechanically coupled with indoor fan 130.

For example, according to the illustrated embodiment, indoor cover 110, or more specifically vertical bulkhead 150 defines a shaft aperture 156 through which drive shaft 154 may pass from outdoor air plenum 114 into indoor air plenum 112. In some exemplary embodiments, drive shaft 154 mechanically couples drive motor 152 which is positioned in outdoor air plenum 114 with indoor fan 130 which is positioned within indoor air plenum 112.

In some exemplary embodiments, air conditioner unit 104 may include a debris shield 160 that is positioned around the drive shaft 154 for blocking debris from passing through shaft aperture 156. Debris shield 160 may generally be any suitable device or structure that has a tendency to block shaft aperture 156 for preventing the flow of debris into indoor air plenum 112. For example, according to the exemplary embodiment illustrated in FIG. 6, debris shield 160 may be an annular disc or washer 162. According to alternative embodiments, debris shield 160 may have any other suitable size, shape, geometry, position, and configuration.

According to the illustrated example embodiment, drive shaft 154 is operably coupled to both indoor fan 130 and outdoor fan 134. In this regard, drive motor 152 may be positioned between the indoor fan 130 and outdoor fan 134 for selectively rotating both fans 130 and 134 during an operating cycle of air conditioner unit 104. It should be appreciated that according to alternative embodiments, outdoor fan 134 may include a dedicated motor. It should be further appreciated that air conditioner unit 104 and refrigeration loop 128 may include additional or alternative components for facilitating a heating or cooling cycle.

According to exemplary embodiments, drive shaft 154 and/or debris shield 160 may include features for positioning debris shield 160 at the desired location or locking debris shield 160 in a particular position. For example, as may be seen in FIG. 6, a locking mechanism 172 may be mounted to drive shaft 154 for locking debris shield 160 in position. Specifically, according to the illustrated embodiment, locking mechanism 172 is a clip 174 that snaps into a locking groove defined on drive shaft 154.

Figure 7:
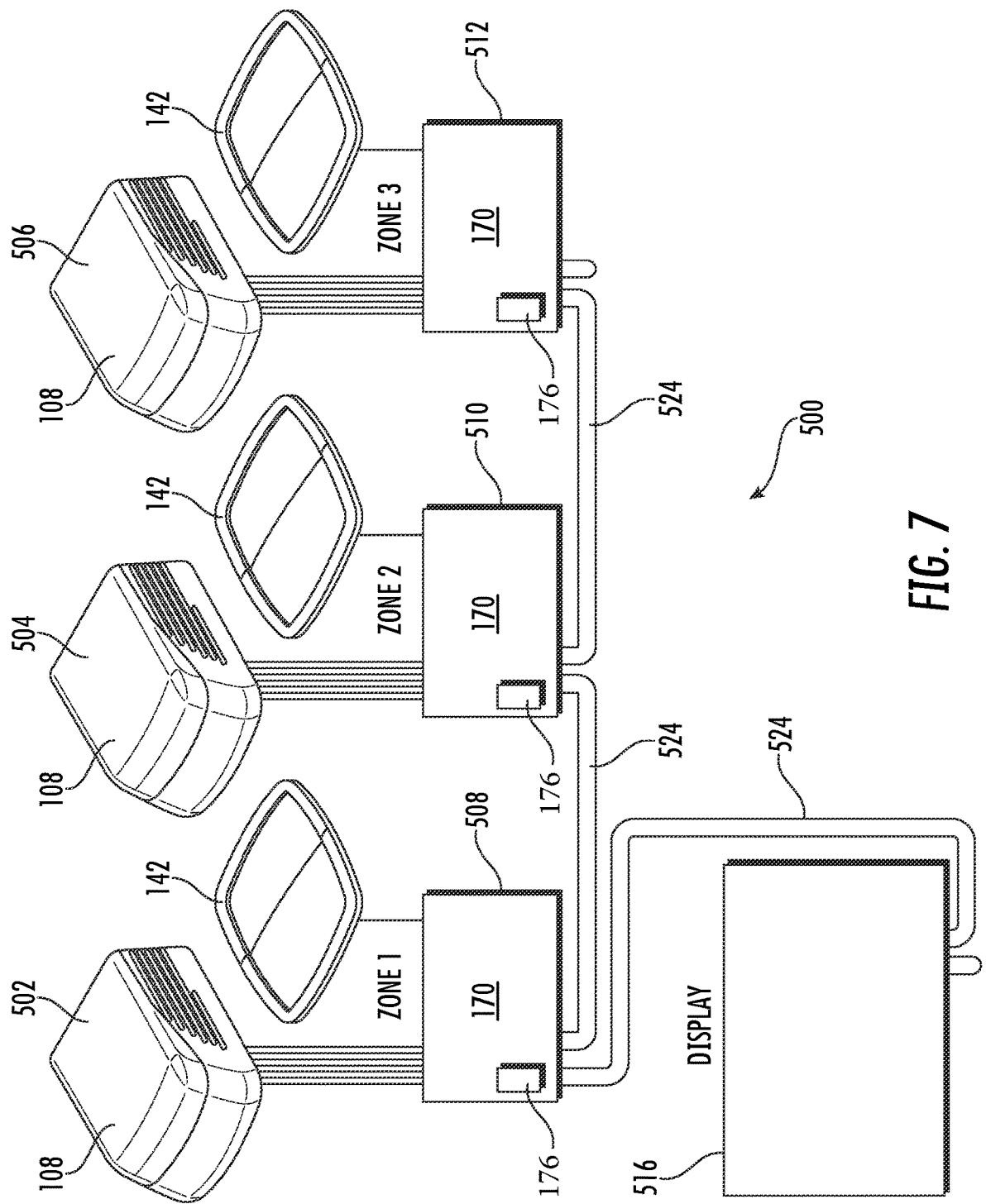
FIG. 7 provides a schematic view of a multiple unit recreational vehicle air conditioner system according to an exemplary embodiment of the present subject matter.

The air conditioner unit 104 may also include a controller 170, e.g., a local controller onboard the recreational vehicle air conditioner 104. For example, as schematically depicted in FIG. 7, the controller 170 of the RVAC unit 104 (or the controller 170 of each unit in a multi-zone or multi-unit system 500, as will be described in more detail below) is onboard the (each) unit 104, e.g., is positioned between the outer grille 108 and the inner cover panel 142 of the RVAC unit 104 or of each respective unit in the multi-unit system 500.

The controller 170 may be generally configured to facilitate operation of the RVAC unit 104. In this regard, components of the RVAC unit 104, such as the fan drive motor 152, compressor 122, etc., may be in communication with controller 170 such that controller 170 may regulate operation of the RVAC unit 104. For example, signals generated by controller 170 may operate the RVAC unit 104, including any or all system components, subsystems, or interconnected devices, in response to user input signals and other control signals, e.g., commands, received from a user interface of the recreational vehicle 100, such as the display commander or external display device 516 described hereinbelow. One or more other components of the RVAC unit 104 (e.g., other than the controller 170 itself) may be in wired or wireless communication with controller 170 via, for example, one or more signal lines or shared communication busses. In this manner, Input/Output ("I/O") signals may be routed between controller 170 and various operational components of the RVAC unit 104.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 170 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 170 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 170 may be operable to execute programming instructions or micro-control code associated with an operating cycle of the RVAC unit 104. In this regard, the instructions may be software or any set of instructions that when executed by the processing device, cause the processing device to perform operations, such as running one or more software applications, displaying a user interface, receiving user input, processing user input, etc. Moreover, it should be noted that controller 170 as disclosed herein is capable of and may be operable to perform any methods, method steps, or portions of methods as disclosed herein. For example, in some embodiments, methods disclosed herein may be embodied in programming instructions stored in the memory and executed by controller 170.

The memory devices may also store data that can be retrieved, manipulated, created, or stored by the one or more processors or portions of controller 170. The data can include, for instance, data to facilitate performance of methods described herein, such as temperature data including a temperature setpoint or set temperature, one or more ambient temperature measurements, etc. The data can be stored locally (e.g., on controller 170) in one or more databases and/or may be split up so that the data is stored in multiple locations. In addition, or alternatively, the one or more database(s) can be connected to controller 170 through any suitable network(s), such as through a high bandwidth local area network (LAN) or wide area network (WAN). In this regard, for example, controller 170 may further include a communication module or interface that may be used to communicate with one or more other component(s) of the RVAC unit 104, controller 170, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 7, an exemplary schematic diagram of a multi-unit air conditioning system 500 for a recreational vehicle, such as recreational vehicle 100, is provided. More specifically, as shown, the multi-unit air conditioning system 500 includes a plurality of air conditioner units, e.g., multiple instances of the air conditioner unit 104 described herein, such as two or more units 104, such as four units 104 or five units 104, etc., or three units 104 as in the example embodiment illustrated in FIG. 7. In particular, the multi-unit air conditioning system 500 includes a plurality of RVAC units each positioned in or proximate to, e.g., above, such as extending through the roof of the recreational vehicle above, a respective zone or portion of the passenger compartment (e.g., first RVAC unit 502 in a first zone, second RVAC unit 504 in a second zone, and third RVAC unit 506 in a third zone), where the plurality of RVAC units are coupled together via respective controllers 170 of each RVAC unit (e.g., first controller 508, second controller 510, and third controller 512). In particular, the RVAC units are coupled together via a shared communication bus 524 with each other and with an external display device 516 (the display device 516 is "external" in that it is external to the RVAC units, e.g., is positioned outside of and spaced apart from the RVAC units, although it is to be understood that the external display device 516 is typically located inside of the recreational vehicle, e.g., within passenger compartment 102 of recreational vehicle 100). The communication bus 524 may, in some embodiments, be an RV-C CAN bus. For example, the communication bus 524 may be constructed and operable according to the RV-C communication profile developed by the Recreation Vehicle Industry Association (RVIA). The display device 516 may be, e.g., a user interface of the recreational vehicle. For instance, the display device 516 may be a user interface such as a display commander communicatively coupled to each RVAC unit via the communication bus 524. The display device 516 may be in operative communication with each RVAC unit of the system 500, whereby each RVAC unit may send status information to the display device 516, e.g., when in thermostat mode and/or each RVAC unit may receive commands from the display device, e.g., when in direct control mode.

Figure 8:
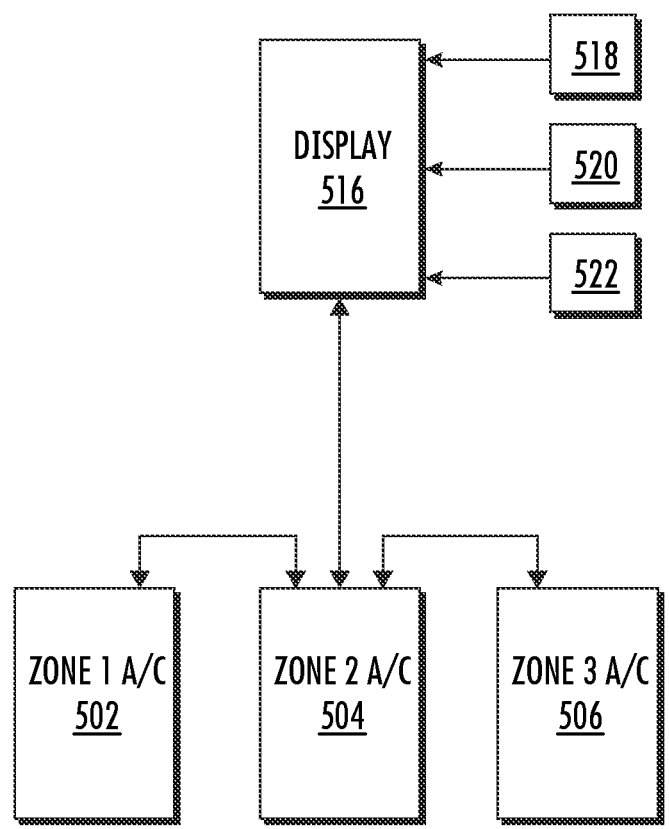
FIG. 8 provides a control schematic for a centralized control mode in the multiple unit recreational vehicle air conditioner system of FIG. 7.
Figure 9:
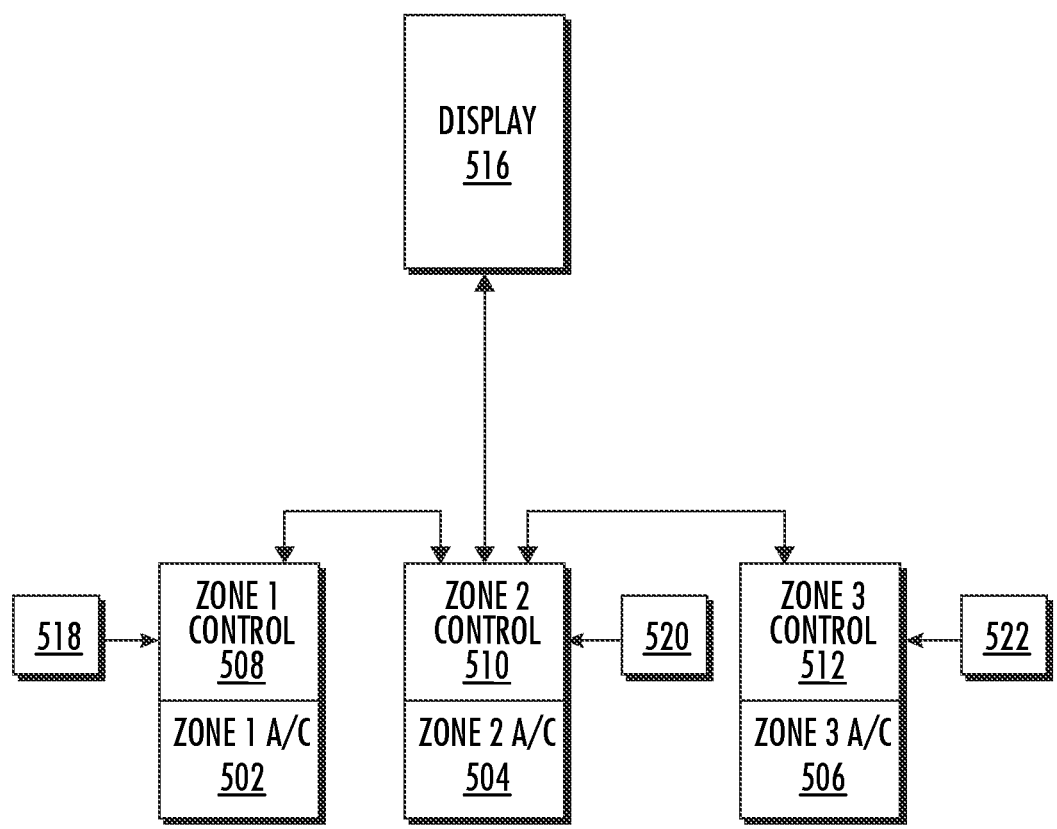
FIG. 9 provides a control schematic for a decentralized control mode in the multiple unit recreational vehicle air conditioner system of FIG. 7.

Turning now to FIGS. 8 and 9, in various embodiments, the multi-unit air conditioning system 500 may include a plurality of room temperature sensors which are each positioned in a respective room or zone within the passenger compartment 102 and are operable and configured to measure an ambient air temperature within the respective zone. The plurality of room temperature sensors may correspond, such as one-to-one correspondence, with the plurality of air conditioner units in the multi-unit system 500, e.g., one zone per sensor and one sensor per zone. For example, the three-zone system 500 illustrated in FIG. 7 may include a first temperature sensor 518 in the first zone (Zone 1), a second temperature sensor 520 in the second zone (Zone 2), and a third temperature sensor 522 in the third zone (Zone 3). The room temperature sensors are in operative communication, via a wired and/or wireless connection, with the external display device 516 and with each RVAC unit 104, such as the respective controller 170 of each RVAC unit 104.

In particular, FIG. 8 depicts a centralized control scheme, e.g., where the RVAC units 502, 504, and 506 (each of which may be an instance of the RVAC unit 104 described herein) are directly controlled by the external display device, e.g., where the RVAC units 502, 504, and 506 are operating in a direct control mode. During such modes, operations, and/or control schemes, the room temperature sensors 518, 520, and 522 communicate directly with the display device 516, such as transmit, via the wired and/or wireless connection, ambient temperature measurements from each respective zone to the display device 516. The display device 516 may then command one or more of the RVAC units to turn on or off in response to the ambient temperature measurement (or measurements) from the corresponding zone, such as based on a difference between the ambient temperature measurement(s) and a set temperature received as a user input at the display device 516.

Turning now specifically to FIG. 9, a decentralized control scheme is illustrated, e.g., where the RVAC units 502, 504, and 506 are operating in a thermostat mode, which may also be referred to as a "set it and forget it" mode. When operating in the decentralized, thermostat mode, the RVAC units receive the set temperature from the display device 516 and each RVAC unit receives one or more ambient temperature measurements from the corresponding room temperature sensor, e.g., directly from the corresponding room temperature sensor, without relaying through or by the display device 516. For example, the one or more ambient temperature measurements may be received by the respective controller 170 of each RVAC unit, such as one or more ambient temperature measurements from first room temperature sensor 518 received by first controller 508 of the first RVAC unit 502, one or more ambient temperature measurements from second room temperature sensor 520 received by second controller 510 of the second RVAC unit 504, and one or more ambient temperature measurements from third room temperature sensor 522 received by third controller 512 of the third RVAC unit 506.

Figure 10:
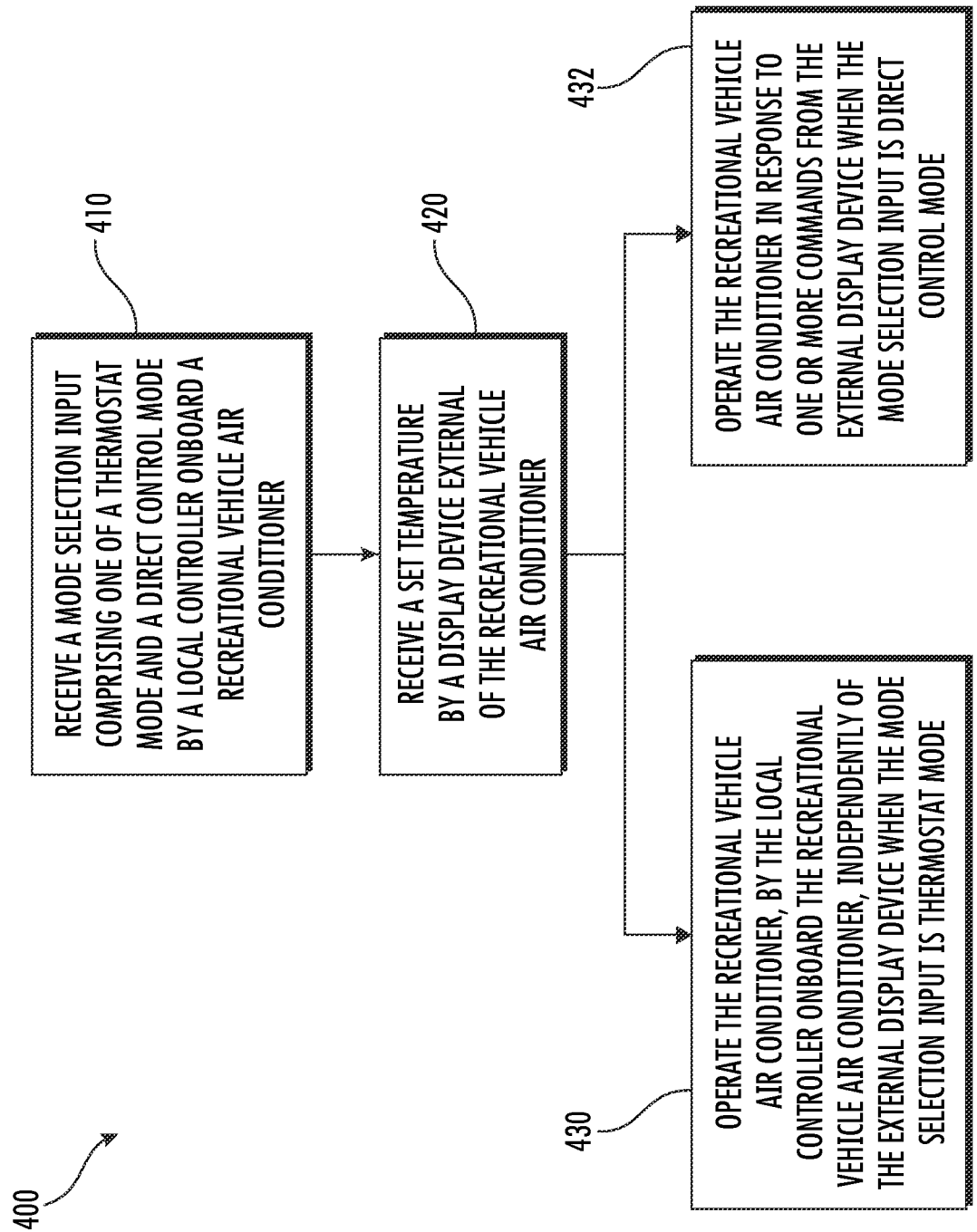
FIG. 10 provides a flow diagram of an exemplary method of operating an RVAC according to one or more exemplary embodiments of the present subject matter.

FIG. 10 illustrates a method 400 for operating a recreational vehicle air conditioner (RVAC) according to an exemplary embodiment of the present subject matter. Method 400 can be used to operate any suitable air conditioner, including a plurality of air conditioner units in a multi-zone system. In particular, controller(s) 170 of one or more air conditioner units 104 may be programmed or configured to implement some or all of the steps of method 400.

As illustrated in FIG. 10, the method 400 may include a step 410 of receiving a mode selection input comprising one of a thermostat mode and a direct control mode. The mode selection input may be received by a controller, e.g., controller 170, of the RVAC unit. For example, in some embodiments, the controller may include a mechanical input, e.g., a switch, such as a dip switch 176 (FIG. 7), from which the mode selection input is received. For example, toggling the dip switch 176 may toggle the controller 170 and the RVAC unit 104 between direct control mode and thermostat mode. As another example, the mode selection input may be electronic, such as an electronic signal received by the controller 170. In such embodiments, the mode selection input signal may be transmitted and/or received over the communication bus 524, such as from the external display device 516.

Also as shown in FIG. 10, the method 400 may further include a step 420 of receiving a set temperature by a display device external of the recreational vehicle air conditioner. As mentioned, the display device may be a user interface of the recreational vehicle, whereby a user may select or input a desired temperature for the passenger compartment 102 at or via the display device 516.

The method 400 may then include one or more steps of operating the RVAC unit, e.g., of turning one or more components of the RVAC unit ON or OFF. Such operating steps may be based on the received set temperature, such as based on a difference between the received set temperature and a measured ambient temperature. For example, as illustrated in FIG. 10, the method 400 may include a step 430 of operating the RVAC, e.g., operating at least one of the outdoor fan, the indoor fan, and the compressor of the RVAC, independently of the external display device when the mode selection input is thermostat mode. Also by way of example, the method 400 may include a step 432 of operating the RVAC, e.g., operating at least one of the outdoor fan, the indoor fan, and the compressor of the RVAC, in response to one or more commands from the external display device when the mode selection input is direct control mode, as illustrated in FIG. 10.

Operating the RVAC independently of the display device by the local controller includes at least commanding one or more components of the RVAC unit to turn ON or OFF by the local controller without a specific command from the display device. Further, in some embodiments, operating the RVAC independently of the display device by the local controller may include receiving the ambient temperature measurement from the corresponding room temperature sensor, such as directly from the corresponding room temperature sensor, e.g., via a wired connection or wirelessly. Additionally, in some embodiments, operating the RVAC independently of the display device by the local controller may include sending and/or receiving data, such as status information and/or temperature data, to and from the external display device, but without receiving commands from the external display device.

The mode selection may apply to cooling operations, and may further apply to heating operations as well. For example, the RVAC may also be configured to provide heating, such as by operating the RVAC unit in a heat pump mode, e.g., using a reversing valve as described above, and/or by activating a furnace or heater of the recreational vehicle. The furnace or heater may be, e.g., an electric resistance heater or any other suitable furnace for a recreational vehicle, which is understood by those of ordinary skill in the art and, as such, the furnace or heater is not specifically illustrated or described in further detail herein for the sake of brevity and clarity. Thus, for example, exemplary methods of operating an RVAC according to the present disclosure may also include determining whether to provide heating, such as determining whether the ambient temperature is less than the set temperature, such as less than the set temperature by at least a threshold amount. When operating in thermostat mode, e.g., when the mode selection input is thermostat mode, the step of determining whether to provide heating may be performed by the local controller onboard the recreational vehicle air conditioner. When operating in direct control mode, e.g., when the mode selection input is direct control more, the step of determining whether to provide heating may be performed by the display device.

In either mode, determining whether to provide heating may include receiving the set temperature, receiving an ambient temperature measurement, and comparing the set temperature to the ambient temperature measurement to determine whether the ambient temperature is below the set temperature and therefore call for heating.

After the determining step, e.g., as a result of determining to provide heating, the local controller may provide heating by activating the furnace (where the furnace may be connected to the controller, e.g., via communication bus 524) and/or by operating the recreational vehicle air conditioner in a heat pump mode, when the mode selection input is thermostat mode. When the mode selection input is direct control mode, the display device may activate the furnace and/or send a command to the RVAC unit to operate in heat pump mode after the display device determines that heating is to be provided.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recreational vehicle air conditioner comprising:
   an indoor cover defining an indoor portion and an outdoor portion;
   an outdoor heat exchanger and an outdoor fan disposed in the outdoor portion;
   an indoor heat exchanger and an indoor fan disposed in the indoor portion;
   a compressor in fluid communication with the outdoor heat exchanger and the indoor heat exchanger to circulate a refrigerant between the outdoor heat exchanger and the indoor heat exchanger; and
   a local controller onboard the recreational vehicle air conditioner, the local controller in operative communication with the outdoor fan, the indoor fan, the compressor, and an external display device, wherein the local controller is configured for:
      receiving a mode selection input comprising one of a thermostat mode and a direct control mode;
      operating at least one of the outdoor fan, the indoor fan, and the compressor independently of the external display device when the mode selection input is thermostat mode; and
      operating at least one of the outdoor fan, the indoor fan, and the compressor in response to one or more commands from the external display device when the mode selection input is direct control mode,
   wherein the recreational vehicle air conditioner is one unit of a multiple unit recreational vehicle air conditioner system, wherein the local controller of the recreational vehicle air conditioner is in operative communication with a local controller onboard every other recreational vehicle air conditioner unit of the multiple unit recreational vehicle air conditioner system, wherein each recreational vehicle air conditioner unit of the multiple unit recreational vehicle air conditioner system comprises a local controller onboard the respective recreational vehicle air conditioner unit in operative communication with the external display device, and wherein the local controller onboard each recreational vehicle air conditioner unit is configured for operating the respective recreational vehicle air conditioner unit independently of the external display device when the mode selection input is thermostat mode, and configured for operating the respective recreational vehicle air conditioner unit in response to one or more commands from the external display device when the mode selection input is direct control mode.

2. The recreational vehicle air conditioner of claim 1, further comprising a mechanical input onboard the recreational vehicle air conditioner, wherein the mode selection input is received via the mechanical input onboard the recreational vehicle air conditioner.

3. The recreational vehicle air conditioner of claim 1, wherein the local controller is configured for receiving the mode selection input from the external display device.

4. The recreational vehicle air conditioner of claim 1, wherein operating at least one of the outdoor fan, the indoor fan, and the compressor independently of the external display device when the mode selection input is thermostat mode comprises receiving, by the local controller onboard the recreational vehicle air conditioner, an ambient temperature measurement directly from a temperature sensor.

5. The recreational vehicle air conditioner of claim 1, wherein the local controller is further configured for receiving an ambient temperature measurement from the external display device when the mode selection input is direct control mode.

6. The recreational vehicle air conditioner of claim 1, wherein the local controller is further configured for determining whether to provide heating when the mode selection input is thermostat mode.

7. The recreational vehicle air conditioner of claim 6, wherein the local controller is in operative communication with a furnace, wherein the local controller is further configured for providing heating by activating the furnace after determining to provide heating.

8. The recreational vehicle air conditioner of claim 6, wherein the local controller is further configured for operating the recreational vehicle air conditioner in a heat pump mode after determining to provide heating.

9. A method of operating a recreational vehicle air conditioner, the recreational vehicle air conditioner comprising an indoor cover defining an indoor portion and an outdoor portion, an outdoor heat exchanger and an outdoor fan disposed in the outdoor portion, an indoor heat exchanger and an indoor fan disposed in the indoor portion, a compressor in fluid communication with the outdoor heat exchanger and the indoor heat exchanger to circulate a refrigerant between the outdoor heat exchanger and the indoor heat exchanger, and a local controller onboard the recreational vehicle air conditioner, the method comprising:
   receiving a mode selection input comprising one of a thermostat mode and a direct control mode;
   receiving a set temperature by a display device external of the recreational vehicle air conditioner;
   operating at least one of the outdoor fan, the indoor fan, and the compressor, by the local controller onboard the recreational vehicle air conditioner, independently of the external display device when the mode selection input is thermostat mode; and
   operating at least one of the outdoor fan, the indoor fan, and the compressor in response to one or more commands from the external display device when the mode selection input is direct control mode, wherein the recreational vehicle air conditioner is one unit of a multiple unit recreational vehicle air conditioner system, wherein each recreational vehicle air conditioner unit of the multiple unit recreational vehicle air conditioner system comprises a local controller onboard the respective recreational vehicle air conditioner unit in operative communication with the external display device, and wherein the method comprises operating each recreational vehicle air conditioner unit, by the local controller onboard the respective recreational vehicle air conditioner unit, independently of the external display device when the mode selection input is thermostat mode and operating each recreational vehicle air conditioner unit in response to one or more commands from the external display device when the mode selection input is direct control mode.

10. The method of claim 9, wherein the mode selection input is received via a mechanical input onboard the recreational vehicle air conditioner.

11. The method of claim 9, wherein the mode selection input is received from the external display device.

12. The method of claim 9, wherein operating at least one of the outdoor fan, the indoor fan, and the compressor independently of the external display device when the mode selection input is thermostat mode comprises receiving, by the local controller onboard the recreational vehicle air conditioner, an ambient temperature measurement directly from a temperature sensor.

13. The method of claim 9, further comprising receiving an ambient temperature measurement by the external display device when the mode selection input is direct control mode.

14. The method of claim 9, further comprising determining, by the local controller onboard the recreational vehicle air conditioner, whether to provide heating when the mode selection input is thermostat mode.

15. The method of claim 14, further comprising providing heating by activating a furnace connected to the local controller onboard the recreational vehicle air conditioner after determining, by the local controller onboard the recreational vehicle air conditioner, to provide heating.

16. The method of claim 14, further comprising providing heating by operating the recreational vehicle air conditioner in a heat pump mode, by the local controller onboard the recreational vehicle air conditioner, after determining, by the local controller onboard the recreational vehicle air conditioner, to provide heating.

* * * * *